(12) United States Patent
Zhu

(10) Patent No.: US 9,121,717 B1
(45) Date of Patent: Sep. 1, 2015

(54) COLLISION AVOIDANCE FOR VEHICLE CONTROL

(71) Applicant: Google Inc., Mountain View, CA (US)

(72) Inventor: Jiajun Zhu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/103,280

(22) Filed: Dec. 11, 2013

Related U.S. Application Data

(63) Continuation of application No. 13/277,580, filed on Oct. 20, 2011, now Pat. No. 8,630,806.

(51) Int. Cl.
*G01C 21/26* (2006.01)
*G08G 9/02* (2006.01)

(52) U.S. Cl.
CPC . *G01C 21/26* (2013.01); *G08G 9/02* (2013.01)

(58) Field of Classification Search
CPC ........ G01C 21/26; G01C 21/005; G01S 5/16; G08G 9/02
USPC .................................................. 701/523, 408
See application file for complete search history.

(56) References Cited

U.S. PATENT DOCUMENTS

| 7,881,497 | B2 | 2/2011 | Ganguli et al. |
| 8,050,863 | B2 | 11/2011 | Trepagnier et al. |
| 8,180,100 | B2 | 5/2012 | Fujimaki et al. |
| 8,346,480 | B2 | 1/2013 | Trepagnier et al. |
| 2007/0219720 | A1 | 9/2007 | Trepagnier et al. |
| 2007/0291130 | A1 | 12/2007 | Broggi et al. |
| 2008/0253606 | A1 | 10/2008 | Fujimaki et al. |
| 2010/0045482 | A1 | 2/2010 | Strauss |

*Primary Examiner* — Mary Cheung
*Assistant Examiner* — Michael Berns
(74) *Attorney, Agent, or Firm* — Lerner, David, Littenberg, Krumholz & Mentlik, LLP

(57) ABSTRACT

A method is provided for processing an image in which only parts of the image that appear above a point on a horizon line are analyzed to identify an object. In one embodiment, the distance between the object and a vehicle is determined, and at least one of the speed and direction of the vehicle is changed when it is determined that the distance is less than the range of a sensor. The method for processing images is not limited to vehicular applications only and it may be used in all applications where computer vision is used to identify objects in an image.

20 Claims, 8 Drawing Sheets

Vehicle 101 is Equipped with A Stereo Camera that Captures Images Of the Road Ahead of the Vehicle

Fig. 1
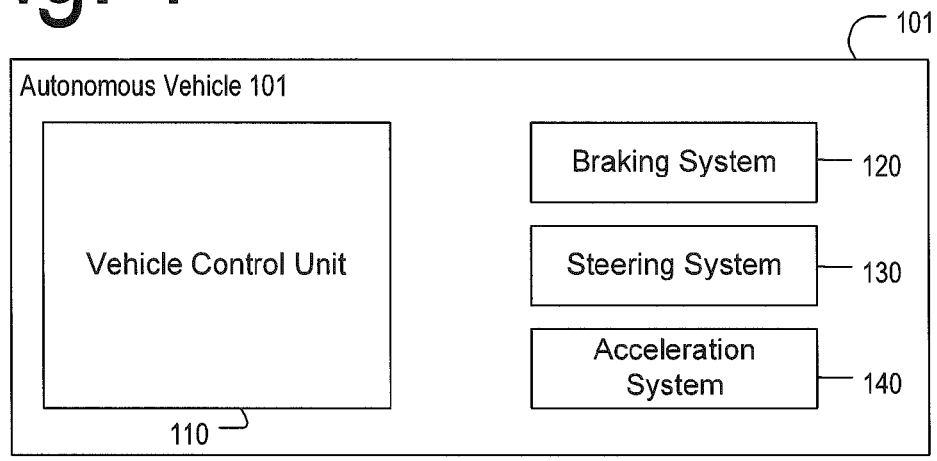
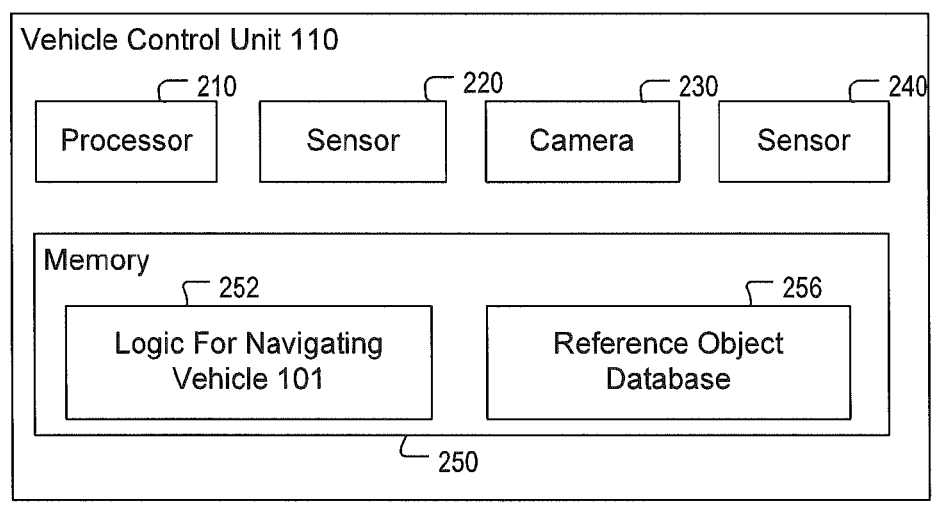
Fig. 2

Fig. 3
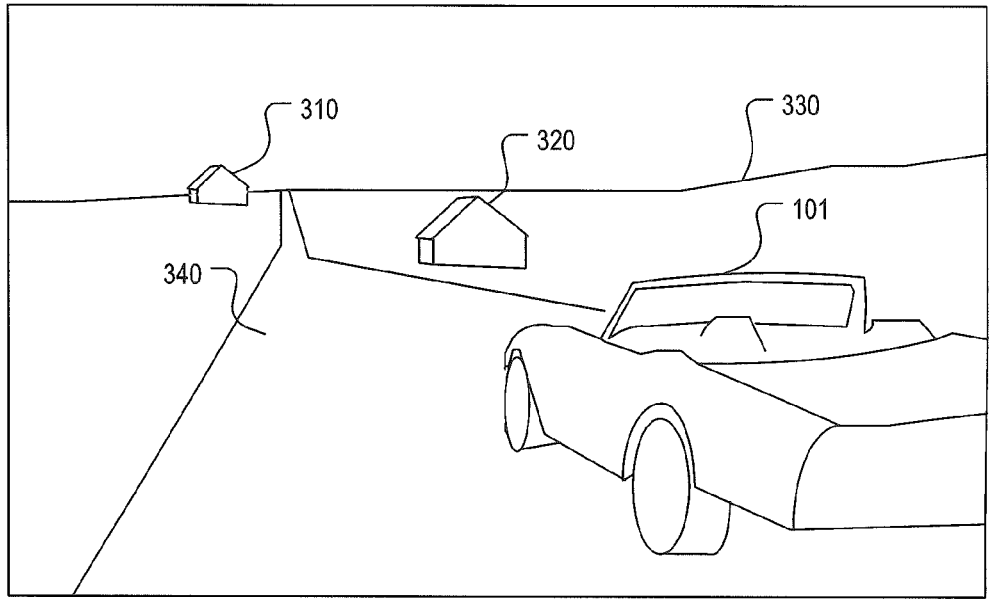
Vehicle 101 is Equipped with A Stereo Camera that Captures Images Of the Road Ahead of the Vehicle
Fig. 4
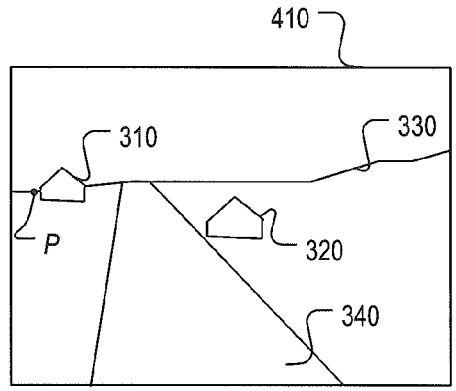 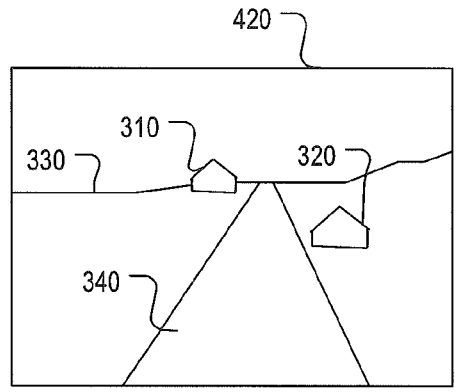
An Image Captured by a Left Image Sensor of the Stereo Camera
An Image Captured by a Right Image Sensor of the Stereo Camera

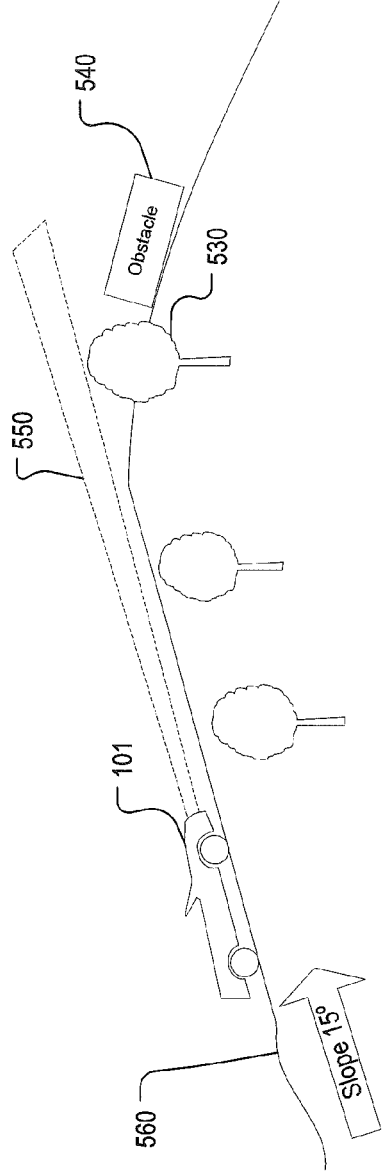
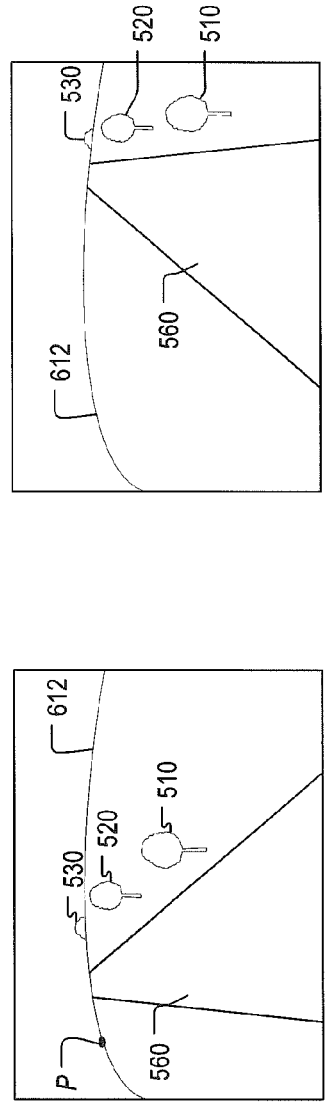

COLLISION AVOIDANCE FOR VEHICLE CONTROL

CROSS REFERENCE TO RELATED APPLICATION

The present application is a continuation of U.S. patent application Ser. No. 13/277,580 filed Oct. 20, 2011, the entire disclosures of which are hereby incorporated by reference.

FIELD OF THE DISCLOSURE

The present invention relates to image processing in general, and, more particularly, to depth perception.

BACKGROUND

Autonomous vehicles use various computing systems and cameras to detect objects in their surroundings. Detecting objects by using a camera, however, can be complex and unreliable. Existing techniques may have varying success rates depending on the texture of images that are being processed. If the images have a homogeneous texture, objects in those images are harder to recognize because they can blend with the background.

SUMMARY

In accordance with one aspect of the disclosure, a method for processing an image is provided in which only parts of the image that appear above a point on a horizon line are analyzed to identify different objects. Because only a fraction of the image may be processed, recognizing objects in this manner requires less work and is therefore more efficient.

Sections of the image below the point on the horizon line are more likely to have a homogeneous texture. Therefore, objects appearing below the point on the horizon line are more likely to blend with the background than objects appearing above. By analyzing only objects that appear above the point on the horizon line, the method reduces the possibility of error and achieves increased accuracy.

The parts of the image that appear below the horizon can be determined by defining a ray R originating at the camera that took the image, or a point close to the camera, and projecting the ray against the image plane. The projection depends on the pitch of the camera that took the image. The point P in the image where the projection intersects the image plane is said to lie on the horizon. The horizon can be either the true horizon or an artificial horizon depending on how the ray R is defined. Exemplary definitions of the ray R are provided in the remainder of this disclosure. In any event, for the purposes of this disclosure, the phrase "point on a horizon line in an image" or "point on a horizon" may include:
 (i) a point P in an image where a ray R, that is projected against the image, intersects the image, or
 (ii) a point that is determined based on a positional or rotational attribute of a camera, such as pitch, or
 (iii) both i and ii.

In some embodiments, the horizon line is correlated with the pitch of the camera by means of a table or other data structure. In these embodiments, the point P is determined by consulting the table and not by dynamically performing the above-described calculation. An advantage of this approach is that it is more computationally efficient.

As discussed herein, aspects of the present disclosure can be applied to the field of autonomous and semi-autonomous vehicles. In accordance with one aspect a vehicle is provided that includes a sensor associated with a range, a camera that captures an image of at least part of the vehicle's surroundings, and a processor, for controlling operation of the vehicle. The processor processes the image to determine a distance between the vehicle and an object appearing above a point on a horizon line in the image, and changes at least one of speed of the vehicle and direction of the vehicle when it is determined that the distance between the vehicle and the object is less than the range of the sensor.

In accordance with another aspect, a method for controlling a vehicle is provided that includes capturing an image of at least part of the vehicle's surroundings, determining the distance between the vehicle and an object appearing above a point on a horizon line in the image, and switching, based on the distance, the control strategy that is used to operate the vehicle.

In accordance with another aspect, a vehicle is provided that comprises a sensor configured to detect objects in the vehicle's surroundings, a camera configured to capture a first image of at least a part of the vehicle's surroundings, a memory; and a processor coupled to the memory, the sensor, and the camera. The sensor being associated with a range. The processor is configured to determine, based on the vehicle's pitch, a point P in the first image, to process the first image to determine distance between the vehicle and an object that is depicted in the first image above the point P, and to change at least one of a speed of the vehicle and a direction of the vehicle when it is determined that the distance between the vehicle and the object is less than the range of the sensor.

In one example, the processor may change at least one of the speed and direction of the vehicle in response to determining that the distance between the vehicle and the object is less than the range associated with the sensor. Alternatively, the processor may change at least one of the speed and direction of the vehicle based on at least one of a grade of a surface on which the vehicle is standing or driving exceeding a threshold, and pitch of the vehicle exceeding a threshold. The changing of the direction of the vehicle may include one or more of making a turn, changing lanes, or selecting a new travel route for the vehicle.

In another example, the camera may be a stereo camera, and the processor may be configured to process both the first image and a second image to determine the distance between the vehicle and the object. Furthermore, the object may be selected for processing based on the object appearing above the point P in the first image.

In accordance with yet another aspect, an apparatus comprises a camera configured to capture a first image, a sensor configured to sense the pitch of the camera, and a processor coupled to the camera and to the sensor. The processor is configured to: select a reference object that is depicted in the first image. The reference object is selected based on the reference object being depicted above a point P in the first image. The point P is determined by the processor based on signal from the sensor that senses the pitch of the camera. The processor is further configured to process the first image to determine the distance between the apparatus and the reference object.

In one example, the camera may be a stereo camera, and the processor may be configured to process both the first image and a second image to determine the distance between the vehicle and the reference object.

In another example, the processor may be further configured to determine a geo-location of the reference object by extracting a template of the reference object from the first image and comparing the template against a database of object representations. Based on the geo-location of the reference object, the processor may determine the geo-location of the apparatus.

In yet another example, the reference object may be selected based on the reference object being represented in a database for storing object representations. Alternatively, the object may be selected based on proximity to the point P.

In accordance with another aspect, a method is provided. The method comprises controlling the operation of a vehicle with a first control strategy; capturing, by a camera, a first image of at least part of the vehicle's surroundings; and processing the first image to determine a distance between the vehicle and a reference object appearing above a point P in the first image. The point P is determined based on the pitch of the vehicle. The reference object is selected based on the reference object being depicted, at least in part, above the point P in the image.

In one example, the method may also comprise switching to controlling the vehicle with a second control strategy based on the magnitude of the distance between the vehicle and the object. The switching may be performed when the distance is less than a range associated with a sensor. Furthermore, controlling the operation of the vehicle with the first control strategy may include maneuvering the vehicle in a first direction. Similarly, controlling the operation of the vehicle with the second control strategy may include maneuvering the vehicle in a second direction different from the first direction.

In another example, the method may further include defining a ray R and projecting the ray R against a plane of the first image, wherein the point P is a point where the projected ray R intercepts the plane of the first image.

In yet another example, the camera may be a stereo camera, and the method may further comprise capturing by the camera a second image, and processing both the first image and the second image to determine the distance between the vehicle and the reference object.

BRIEF DESCRIPTION OF THE DRAWINGS

FIG. 1 is a schematic diagram of the components of autonomous vehicle 101 in accordance with one aspect of the disclosure FIG. 2 is a schematic diagram of a vehicle control unit in accordance with one aspect of the disclosure.

FIG. 3 is an example of the operation of a vehicle in accordance with one aspect of the disclosure.

FIG. 4 is an example of images captured by a camera.

FIG. 5 is an example of the operation of a vehicle in accordance with one aspect of the disclosure.

FIG. 6 is an example of images captured by a camera.

DETAILED DESCRIPTION

Figure 7:
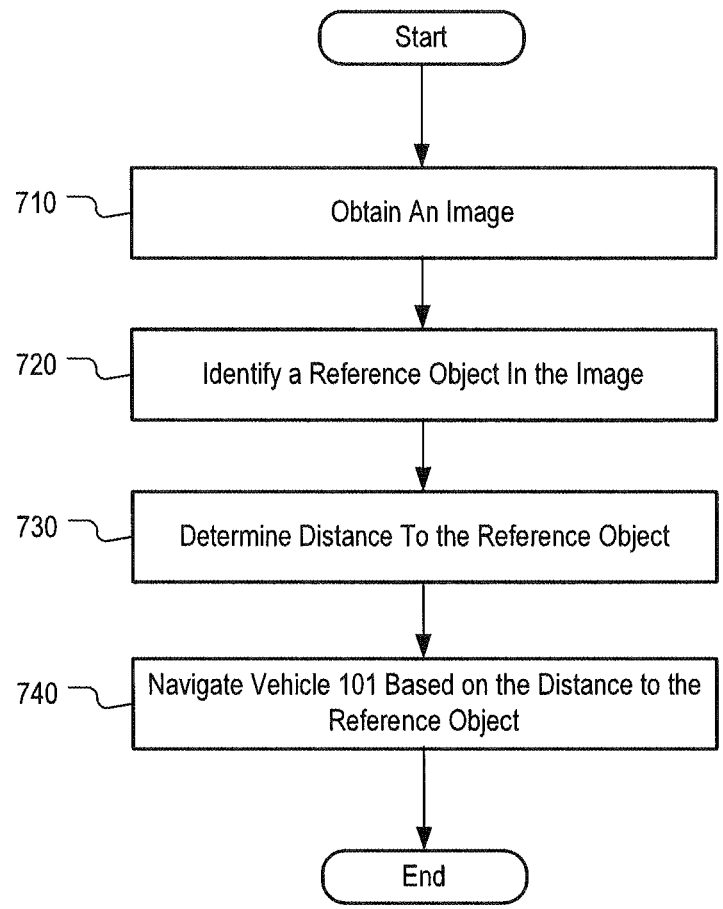
FIG. 7 is a flowchart of a process in accordance with one aspect of the disclosure.

FIG. 1 depicts a schematic diagram of the components of autonomous vehicle 101 in accordance with one aspect of the disclosure. As shown in this example vehicle 101 includes vehicle control unit 110, braking system 120, steering system 130, and acceleration system 140.

Vehicle 101 is equipped with an autopilot system that enables it to operate in an autonomous or semi-autonomous mode. That is, vehicle 101 is capable of driving from one point to another without (or with partial) input from a human driver. In some embodiments, vehicle 101 is an automobile. In various embodiments vehicle 101 may be a car, truck, motorcycle, bus, boat, airplane, helicopter, lawnmower, recreational vehicle, amusement park vehicle, farm equipment, construction equipment, tram, golf cart, trains, trolleys, robots, gliders, warehouse equipment, factory equipment, etc.

Vehicle control unit 110 is a system for controlling the operation of vehicle 101. Vehicle control unit 110 interacts with breaking system 120, steering system 130, and acceleration system 140 to cause vehicle 110 to slow down, stop, steer, or accelerate. The structure and operation of vehicle 110, in accordance with one aspect of the present disclosure, is further described in the discussion with respect to FIG. 2.

FIG. 2 depicts a schematic diagram of vehicle control unit 110 in accordance with one aspect of the disclosure. In this example vehicle control unit 110 comprises processor 210, sensor 220, camera 230, sensor 240, and memory 250.

Processor 210, in accordance with one embodiment, is a general purpose central processing unit. In other examples, processor 210 can be a special-purpose device such as an FPGA, an ASIC, etc. Furthermore, vehicle control unit 110 may include multiple processors 210.

Sensor 220, in accordance with one embodiment, is a sensor for sensing the pitch of vehicle 101. The sensor 220 may alternatively sense another displacement or rotation of vehicle 101, such as, yaw, roll, distance from ground, and so forth. Furthermore, the sensor 220 may sense the grade, or another topological property of a surface on which vehicle 101 is placed or driving.

Camera 230, in accordance with one embodiment, is a stereo camera. Nevertheless, in other embodiments the camera 230 may be a single-lens camera, or another type of multi-lens camera (e.g. quadralens camera, etc.). Although in some examples camera 230 may be a monolithic unit, alternative examples can be employed where camera 230 includes multiple single-lens cameras that are arranged to operate in a stereoscopic fashion.

Sensor 240, in accordance with one embodiment, is a laser scanner. Vehicle control unit 110 uses sensor 240 to scan the vehicle's surroundings. For example, vehicle control unit 110 can use the scanner to scan the road ahead of vehicle 240 and detect obstacles that lie in the vehicle's way. When obstacles are detected, vehicle control unit 110 can adjust the course of the vehicle 101 in order to avoid the detected obstacles. The adjustment may include steering the vehicle, slowing down, stopping the vehicle, honking the horn, turning the headlights, and so forth.

Sensor 240 is associated with a field of view. The field of view is the extent of the observable world that is visible to sensor 240. In one example, the field of view of sensor 240 is 300 meters at a horizontal peripheral of 60 degrees.

In addition, sensor 240 is associated with a range. The range is the maximum distance at which sensor 240 is considered to provide reliable information. In one example, the range of sensor 240 is a value set in logic 252 that represents how information from sensor 240 is interpreted by vehicle control unit 110. For example, it can be the maximum distance at which sensor 240 is considered by processes for controlling vehicle 101 to provide reliable information. In an alternative example, the range is a value that represents the sensor's true physical limitations.

Although, sensor 240 is a laser scanner in accordance with some embodiments, in an alternative embodiment sensor 240 may be another type of device for detecting objects in the surroundings of vehicle 101, such as sonar, radar, lidar, etc. Although sensor 240 may be an individual sensor, in an alternative embodiment the sensor 240 may comprise an array of sensors. (e.g. an array including radar, sonar, and laser array.).

Memory 250, in accordance with one embodiment, is random access memory (RAM). Alternatively, memory 250 may comprise any other type of tangible storage device, such as, read only memory (ROM), flash memory, CD-ROM, DVD, memory card, hard-disk, etc.

Memory 250 stores logic 252 and database 256. Logic 252 includes processor-executable instructions that implement a method for controlling the operation of vehicle 101. In some embodiments, the method relies on input from one or more sensors, such as sensors 220 and 240. In some embodiments, logic 252 is used by vehicle control unit 110 to calculate travel routes, identify the vehicle's current location, identify the vehicle's destination, and so forth. In some embodiments, logic 252 includes a control strategy. For example, the control strategy may include where to turn, at what speeds to travel, where to look for traffic signals, where to stop for intersections or stop signs, etc.

Database 256 is a database that contains records of the appearance of objects. Examples of such objects are trees, buildings, bushes, rocks, hills, mountains, utility posts, people, billboards, animals, and so forth. In some embodiments, the records are cross referenced with their geographic coordinates. The records can include photographs of the objects (e.g., in jpg, png, tiff or bmp format) or any other representation of appearance, such as 3D models of objects, sets of vertices, eigenvectors, sets of wavelets, etc. Although database 256 is stored in memory 250, in an alternative embodiment, the database 256 is stored remotely (e.g. at a remote server, etc.).

FIG. 3 depicts an example of the operation of vehicle 101 in accordance with one aspect of the disclosure. In this example, vehicle 101 is traveling on road 340. Objects 310 and 320 are seen in the distance. As vehicle 101 is moving, camera 230, such as a stereo camera, captures images 410 and 420 of the road ahead of the vehicle, as shown in FIG. 4A. Image 410 represents an image captured by a "left" image capturing unit of camera 230 and image 420 represents an image captured by a "right" image capturing unit of camera 230.

Vehicle control unit 110 processes images 410 and 420 to determine the distance between vehicle 101 and object 310 by executing a computer vision process for extracting spatial information from images 410 and 420. The spatial information is obtained based on disparities between the two images. For example, object 310 appears close to the left side of image 410 while it appears in the middle of image 420. This disparity, as well as others, can be used to determine the "depth" or distance to object 310.

In determining the "depth" or distance to object 310, vehicle control unit 110 executes a task known as matching. Matching involves obtaining a template of object 310 from image 410 and matching it to image 420 in order to identify the location of object 310 in image 420. Matching, in other words, is a problem of pattern recognition that involves processing an image to identify the position of an object in the image.

One challenge in matching arises when images have a homogeneous texture. If an image has a homogeneous texture, objects in it blend with the background and become difficult to recognize. In one aspect, the method employed by vehicle control unit 110 handles this challenge by selecting objects that appear above the horizon line. Objects that are above the horizon are more likely to stand out over their background.

Consequently, in the example at hand, vehicle control unit 110 determines the distance to object 310, and not object 320, because object 310 appears above the point P on horizon line 330. The position of object 310 above the horizon line, increases the probability that vehicle control unit 110 will be able to successfully match object 310 in images 410 and 420 and determine the distance between it and vehicle 101.

Once vehicle control unit 110 determines the distance, it can use it in a number of ways. For example, vehicle control unit 110 may use the distance to estimate the location of vehicle 101 or, alternatively, it can use the distance to select a proper control strategy for the vehicle. Different uses of distance information are described in more detail in the remainder of this disclosure.

FIG. 5 depicts an example of the operation of vehicle 101 in accordance with one aspect of the disclosure. In particular, FIG. 5 provides an example of a situation in which the topology of the surroundings of vehicle 101 can result in diminished sensory field of view. In accordance with the example, vehicle 101 is traveling uphill on road 560. As vehicle 101 is climbing the hill, vehicle control unit 110 scans road 560 with sensor 240 to detect obstacles ahead of the vehicle. However, because obstacle 540 is hidden behind the top of the hill, sensor 240 fails to detect it.

Obstacle 540 is within the range of sensor 240. Nevertheless, because of the road's topology, sensor 240 shoots above obstacle 540. Thus, sensor 240 feeds vehicle control unit 110 with inaccurate information that the road is clear. Such inaccurate information can result in an accident. It can cause vehicle control unit 110 to miscalculate the controls of vehicle 101 and crash the vehicle into obstacle 540.

To prevent such collisions from happening, vehicle control unit 110 uses camera 230 to identify situations where the field of view of sensor 240 is diminished. In particular, as shown in FIG. 6, vehicle control unit 110 uses camera 230 to take pictures of the environment ahead of the vehicle and identifies an object that is situated above the point P on horizon line 612, such as tree 530. It should be noted that in this example, horizon line 612 is the visible horizon; However, horizon line 612 may be an artificial horizon, absolute horizon, etc.

After the object is identified, vehicle control unit 110 calculates the distance between vehicle 101 and the object. If the distance is less than the range of sensor 240, vehicle control unit 110 may take a corrective action. For example, the corrective action can include changing the speed or direction of vehicle 101 or starting to use a new control strategy.

Under some circumstances, the vantage point of camera 240 can be important. The lower the camera is positioned above the ground, the more likely it becomes that objects that are closer to vehicle 101 will appear above horizon line 530. Placing the camera at a low location, in other words, increases the probability that more objects will appear above the horizon in images 610 and 620.

For this reason, in some embodiments, camera 230 may be placed below the belt line of vehicle 101. For example, camera 101 can be placed on the front bumper of vehicle 101. (e.g. one image capturing unit on one side of the bumper, and another image capturing unit on the other side of the bumper, etc.), below the bottom edges of the doors of vehicle 101 (e.g.

one image capturing unit under the driver's door, and another image capturing unit on the under the front passenger door, etc.), and so forth. Although camera 230 can be placed below the belt line of vehicle 101, camera 230 may alternatively be placed above the vehicle's belt line.

In addition, in some embodiments, a corrective action is executed only when vehicle control unit 110, by using sensor 220 for example, detects that the grade of the surface over which vehicle 101 is standing or driving exceeds a threshold value. For example, the method can be executed only when the grade exceeds: −5°, −10°, −15°, −20°, −25°, −35°, −45°, −60°, −70°, 5°, 10°, 15°, 20°, 25°, 35°, 45°, 60°, 70°, etc.

FIG. 7 is a flowchart of tasks of a process in accordance with one aspect of the disclosure. FIG. 7 includes the following tasks:

710—Obtaining an image from a camera.
720—Identifying a reference object in the mage.
730—Determining distance to the reference object.
740—Navigating a vehicle based on the distance.

At task 710, one or more images are obtained from a camera. At task 720, a reference object is identified. Task 720 is further described below in the discussion with respect to FIG. 8. At task 730, a distance to the reference object is determined. In one embodiment, the distance between the camera that took the image and the reference object is determined. In other embodiments, the distance between a point that is in proximity to the camera (e.g. front bumper of vehicle 101, etc.) and the reference object is determined.

Furthermore, in one embodiment, only parts of the image(s) received at task 710 are processed to determine distance to the reference object. The processed parts are those located above the point determined at task 720. In other embodiments, the full images are processed.

In one example, the distance is determined from binocular cues found in pairs of corresponding images, such as, images 410 and 420 for example. In particular, the distance may be determined by using computer depth perception techniques such as triangulation. Although one example uses triangulation, it should be noted that the disclosure is not limited to any specific computer depth perception technique. Alternatives may rely on any computer depth perception technique that is known in the art, such as, for example and without limitation, methods based on analysis of image disparities, methods based on analysis of disparities between a specific feature in two images and methods based on area disparities.

The distance may also be determined from monocular cues. The present disclosure is not limited to any particular technique for analyzing monocular cues. Alternative embodiments can use any technique for monocular queue analysis, such as motion parallax, texture gradient, and perspective.

At task 740, vehicle control unit 110 controls the operation of vehicle 101 based on the distance determined at task 730. Task 740 is further described in the discussion with respect to FIGS. 10-12.

It should be noted that tasks 710-740 are provided as an example. The tasks associated with FIG. 7 may be performed in a different order than represented, and one or more of the tasks may be performed concurrently. Furthermore, one or more of the tasks may be omitted. For example, task 740 can be omitted from a non-vehicular application.

Furthermore, the process of FIG. 7 is not limited to autonomous vehicles and vehicle control units. Although in accordance with one embodiment, tasks 710-730 may be executed by processor 210 of vehicle control unit 110, tasks 710-730 may be executed by another processor-based device, such as a personal navigation device, obstacle recognition device, cellular phone, and digital camera.

Figure 8:
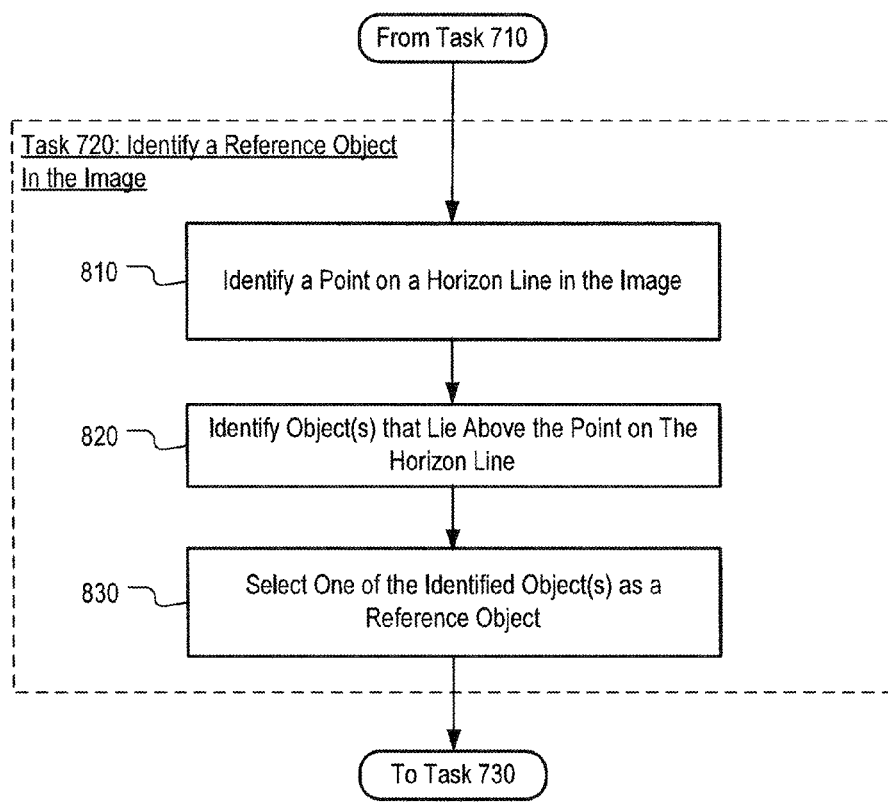
FIG. 8 is a flowchart of the execution of FIG. 7 in accordance with one aspect of the disclosure.

FIG. 8 is a flowchart of the execution of sub-tasks associated with task 720 in accordance with one aspect of the disclosure. It will be recalled that task 720 requires "identifying a reference object." In one example, task 720 includes the following subtasks:

810—Identifying at a point on a horizon line in an image.
820—Identifying candidate objects.
830—Selecting one of the candidate objects as a reference object.

At task 810, a point on or adjacent to a horizon line in the image is identified. The point can be referenced by using Cartesian coordinates (e.g. a point that appears 10 pixels to the left and 50 below the top left image corner), polar coordinates, a single number (e.g. array index). Although, in this example, a single point on the horizon line is determined, in alternative examples multiple points, sections of the horizon line, or the whole horizon line may be determined. Again, the horizon line can be the true horizon, the visible horizon, an artificial horizon, etc.

In one embodiment, the point on the horizon line is determined based on the pitch of the camera that was used to take the images received at task 710. In other embodiments, the point may be determined based on another type of positional or rotational parameter of the camera, such as roll, yaw or distance from ground. The positional or rotational parameters can be determined by using a gyroscope or other similar sensors that are part of the camera. Or alternatively, the positional or rotational parameters can be determined by using a sensor, such as sensor 240, that is part of a vehicle on which the camera is mounted.

Furthermore, in one embodiment, the point on the horizon is determined based on the pitch of a vehicle on which the camera is mounted (e.g. vehicle 101). In other embodiments, however, the point is determined based on another type of positional or rotational parameter of the vehicle, such as roll, yaw or distance from ground.

In one embodiment, the point may be calculated based on the intersection of the projection of a ray R with the plane of image 410. In this case, the manner in which the calculation is performed is further described in the discussion with respect to FIG. 9.

In other embodiments, the point on the horizon line may be determined by consulting a table of pre-stored data. The data in the table can be obtained empirically or calculated by executing the process of FIG. 9. The table can be stored in memory 250 or elsewhere (e.g. at a remote server).

In one example, the table relates different values for camera pitch to the coordinates of points on corresponding horizon lines. In this example, the table provides that when the camera has a pitch of ten (10) degrees, the point P in the image is located at one (1) pixel to the right of the image's top left corner, and twenty-five (25) pixels below.

TABLE 1

A table relating a camera's pitch to coordinates of a point on a horizon line.

| Camera Pitch | Point on A Horizon Line (X,Y) |
|---|---|
| +10° | 1, 25 |
| −10° | 1, 50 |

In another example, the table relates different values for the pitch of the vehicle on which the camera is mounted (e.g., vehicle 101) to a vector representing a horizon line. The vector specifies the starting point and end point of the horizon line:

TABLE 2

A table relating a vehicle's pitch to a vector
representing a horizon line (e.g., true horizon, visible
horizon, artificial horizon, etc.).

| Vehicle Pitch | Horizon Line (X,Y) |
|---|---|
| +10° | 1, 25 – 200, 27 |
| –10° | 1, 50 – 200, 58 |

In yet another example, the table relates combinations of pitch and roll of the camera to different horizon line vectors:

TABLE 3

A table relating camera's pitch and roll to a vector
representing a horizon line (e.g., true horizon, visible
horizon, artificial horizon, etc.).

| Camera Pitch, Roll | Horizon Line (X,Y) |
|---|---|
| +10°, –10° | 1, 25 – 200, 27 |
| +10°, –10° | 1, 25 – 200, 23 |

At task 820, one or more candidate objects that lie above the point determined at task 810 are identified. A candidate object can be any object that is depicted in the image. For example, candidate objects can be trees, buildings, bushes, rocks, hills, mountains, utility posts, people, billboards, animals, other vehicles, and so forth.

In one embodiment, for a candidate object to be considered as such, it has to be at least partially above the point identified at task 810 or, put differently, parts of the object are allowed to be situated below the point on the horizon line.

Regarding the horizontal position of candidate objects, in some embodiments, the candidate objects can have any horizontal position relative to the point determined at task 810. In other embodiments, however, the candidate objects are within a specific horizontal distance from the point (e.g., 0 pixels, 1 pixel to the left, 3 pixels to the right, 20 pixels to the left, etc.)

At task 830, vehicle control unit selects one of the candidate objects as a reference object. In some embodiments, vehicle control unit 110 selects the reference object in accordance with a predetermined selection criterion. For example, the criterion can be based on distance, texture, shape, color, etc.

In one embodiment, vehicle control unit 110 selects the reference object based on the distance between the object and a point on a horizon line in the image. The distance can be absolute or relative. For example, vehicle control unit 110 can select the candidate object that appears the closest or furthest from the point on the horizon line. Alternatively, vehicle control unit 110 can select the candidate object that is within X pixels from the point on the horizon line or Y meters from the horizon line, etc.

In another embodiment, a candidate object is selected based on the candidate object being represented in a database such as database 260. Templates of the candidate objects are extracted from the image(s) received at task 710 and compared to the object representations in the database. In this example, for an object to be selected as a reference object, it must match one of the object representations in the database.

It should be noted that in situations where only one candidate object is identified, the reference object can be selected without determining whether the candidate objects matches a predetermined criterion. Or alternatively, the predetermined criterion can still be applied.

It should further be noted that tasks 810-830 are provided as an example. The tasks associated with FIG. 8 may be performed in a different order than represented, and one or more of the tasks may be performed concurrently. Furthermore, one or more of the tasks may be omitted.

Figure 9:
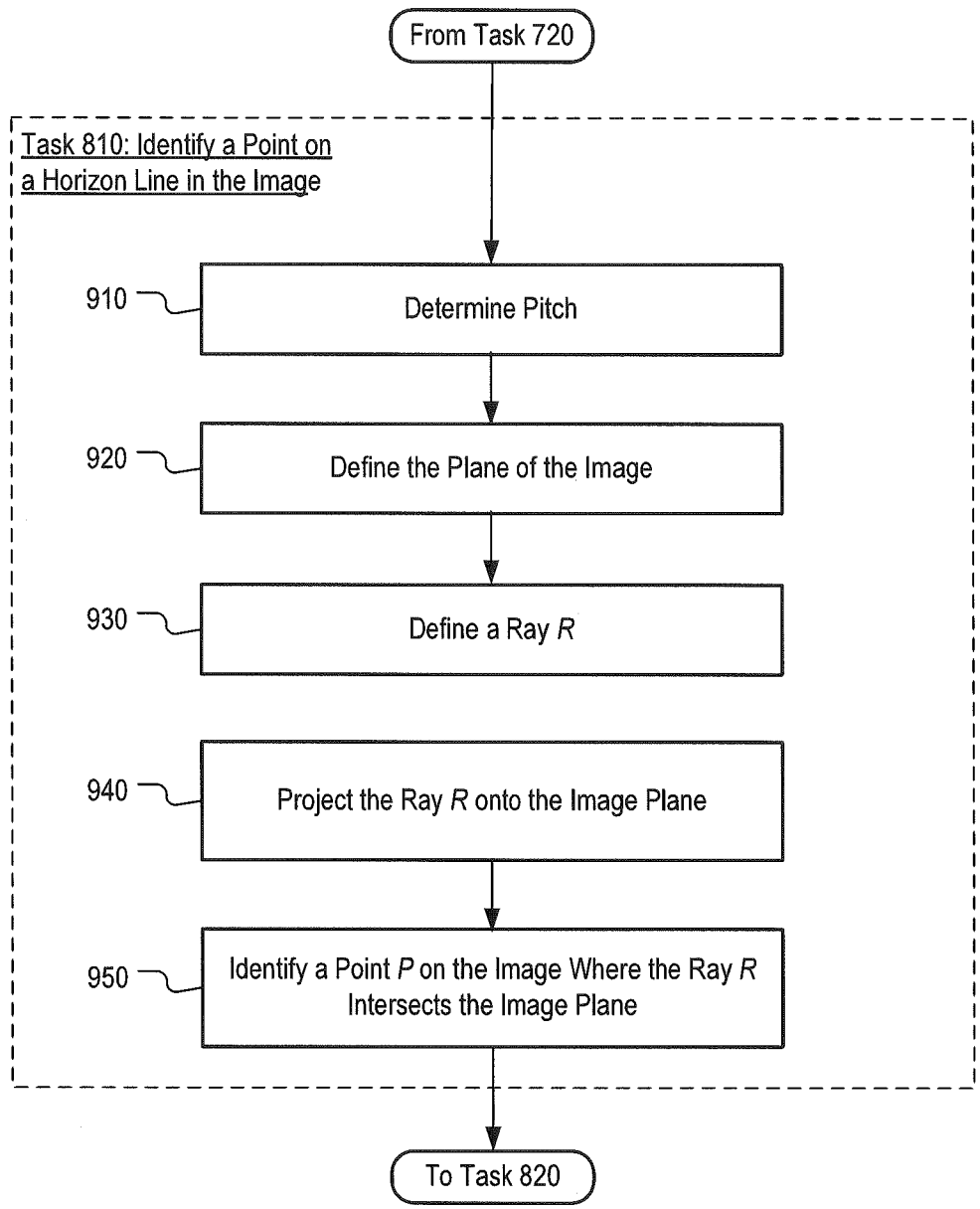
FIG. 9 is a flowchart of the execution of sub-tasks of FIG. 8 in accordance with one aspect of the disclosure.

FIG. 9 is an example flowchart of sub-tasks associated with task 810 in accordance with one aspect of the disclosure. It will be recalled that task 810 requires "identifying a point on a horizon line in the image." In one example, task 810 includes the following sub-tasks:
910—Determining pitch.
920—Defining the plane of the image.
930—Defining a ray R.
940—Projecting the ray R against the plane of the image.
950—Identifying a point P where the ray R intersects the plane of the image.

At task 910, in accordance with one embodiment, the pitch of the camera that took the image(s) received at task 710 is determined. In other embodiments, however, the pitch of a vehicle on which the camera is mounted is determined (e.g., vehicle 101). At task 920, the plane of the image(s) received at task 710 is defined based on the pitch determined at task 910.

At task 930, a ray R is defined. In one illustrative embodiment, the ray R that originates at the camera that took the image and runs perpendicular to the Earth's gravity field. However, alternative embodiments of the present disclosure can be employed where the line L originates at a different point, such as, for example, and without limitation, a point on vehicle 101 (e.g., bumper, windshield, etc.), a point on the axis connecting two different image capturing units of a stereo camera, a point on the corpus of an electronic device implementing the method of FIG. 7, etc. Although, in the illustrative embodiment, the ray R runs perpendicular to the Earth's field of gravity, in alternative embodiments, the ray R runs in parallel with the section of the road on which vehicle 101 is situated. For example, and without limitation, the ray R can be parallel to a tangent that touches a point on the road under vehicle 101.

At task 940, vehicle control unit 110 projects the ray R in the 2D space where the plane of the image belongs.

At task 950, vehicle control unit 110 identifies a point P on the image where the ray R intersects the image plane. The point P is a point on a horizon line in the image.

It should be noted that tasks 910-950 are provided as an example. The tasks associated with FIG. 9 may be performed in a different order than represented, and one or more of the tasks may be performed concurrently. Furthermore, one or more of the tasks may be omitted.

Figure 10:
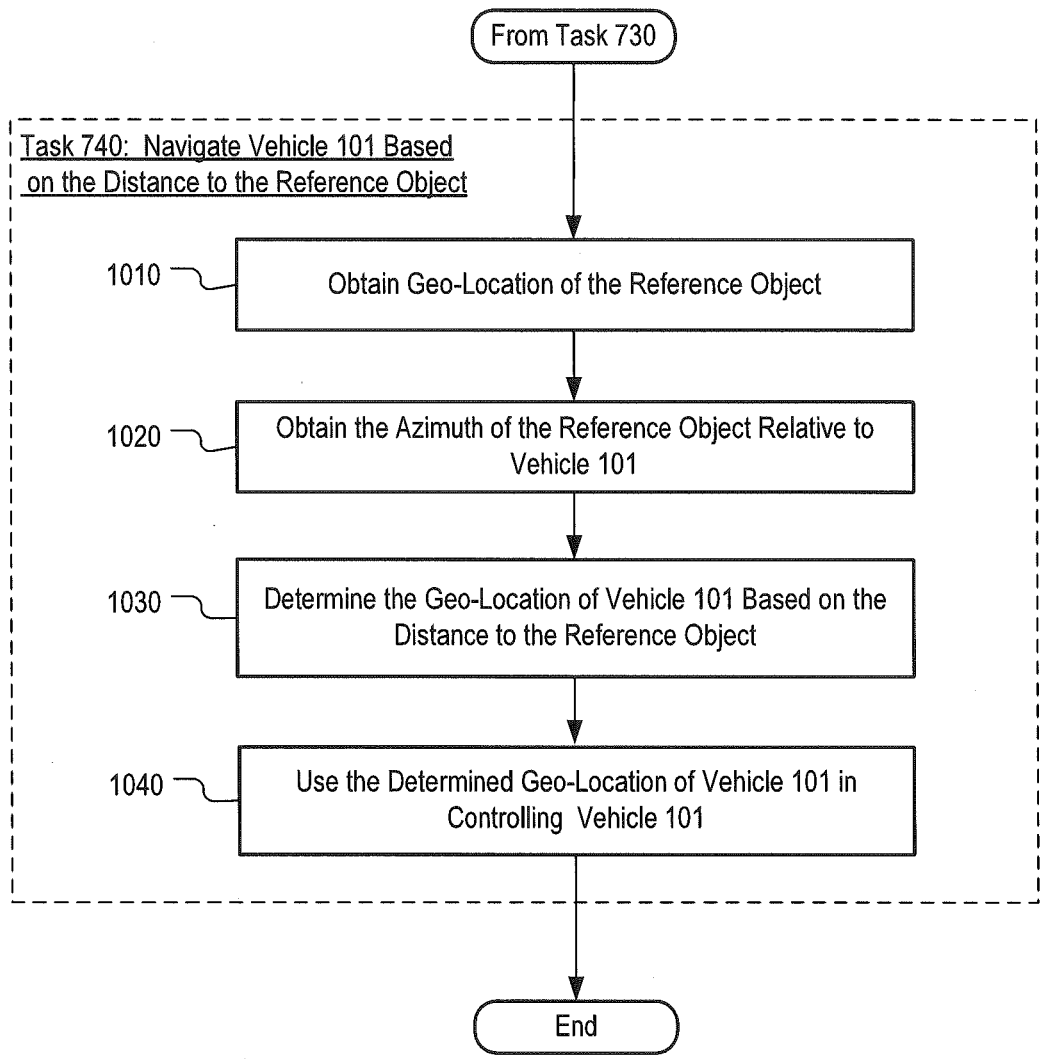
FIG. 10 is a flowchart of the execution of subtasks of FIG. 7 in accordance with one aspect of the disclosure.

FIG. 10 is a flowchart of the execution of sub-tasks associated with task 740 in accordance with one aspect of the disclosure. It will be recalled that task 740 requires "navigating vehicle 101 based in the distance between vehicle 101 and the reference object." In one example, task 740 includes the following subtasks:
1010—Determining the geo-location of the reference object.
1020—Obtaining the azimuth of the reference object relative to vehicle 101.
1030—Determining the geo-location of vehicle 101.
1040—Using the Geo-Location in the operation of vehicle control unit 110.

At task of 1010, the coordinates of the reference object are obtained from database 260. An image of the reference object is compared against the image representations in database 260 and the coordinates for an image representation that matches the reference object are retrieved.

At task 1020, the azimuth of the reference object relative to vehicle 101 is determined. The azimuth is determined by analyzing the image(s) received at task 710.

At task 1030, the geo-location of vehicle 101 is determined based on the distance between vehicle 101 and the object and the information obtained at tasks 1010-1020. Although, the geo-location of vehicle 101 is determined, alternatively the location of the camera that took the image(s) obtained at task 710 may be determined.

At task 1040, vehicle control unit 110 uses the geo-location of vehicle 101 in controlling the operation of the vehicle. For example, vehicle control unit 101 can steer the vehicle, slow down the vehicle, etc. It is well-understood that geo-location information has various uses in the operation autonomous or semi-autonomous vehicle control systems.

Tasks 1010-1040 are provided as an example. The tasks associated with FIG. 9 may be performed in a different order than represented, and one or more of the tasks may be performed concurrently. Furthermore, one or more of the tasks may be omitted.

Figure 11:
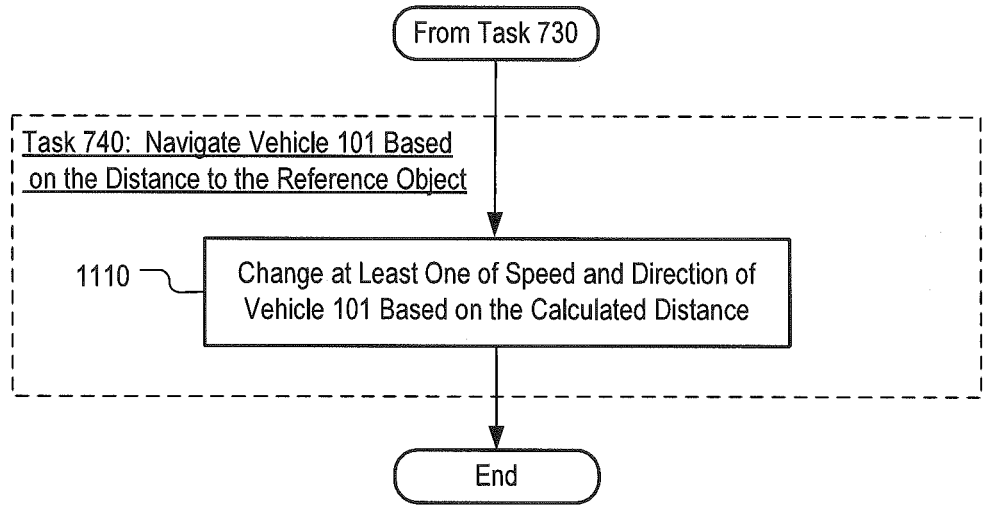
FIG. 11 is a flowchart of the execution of the sub-tasks of FIG. 7 in accordance with one aspect of the disclosure.

FIG. 11 is a flowchart of the execution of sub-tasks associated with task 740 in accordance with one aspect of the disclosure. It will be recalled that task 740 requires "navigating vehicle 101 based in the distance between vehicle 101 and the reference object." In one example, task 740 includes changing the speed or direction of the vehicle. Specifically, at task 1110, vehicle control unit 110 changes at least one of the speed and direction of vehicle 101 based on the distance between vehicle 101 and the reference object identified at task 730. For instance, vehicle 101 may slow down if the distance between the object and the vehicle falls below a threshold. The threshold can be based on the range of sensor 240, the field of view of sensor 240, or another sensor property. Referring to the example of FIG. 5, vehicle 101 can slow down in response to detecting that the distance between the reference object and vehicle 101 is less than the range of sensor 240. In this way, vehicle 101 will be able to stop in order to avoid colliding with any obstacles that sensor 240 has failed to detect.

Similarly, referring to the example of FIG. 3, vehicle 101 may operate according to a control strategy that requires vehicle 101 to make a right turn when it reaches object 310. So, in this example, vehicle control unit 110 may move vehicle 101 to the right lane when it is within X miles from the reference so that the vehicle is in the right lane on the highway when the time to make the turn comes. Or alternatively, vehicle control unit 110 may make a turn when the reference object is reached.

Figure 12:
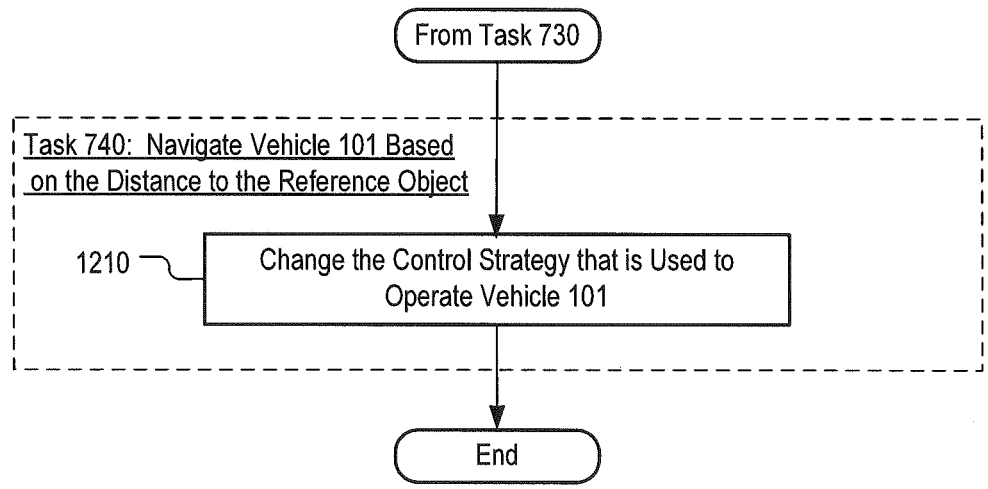
FIG. 12 is a flowchart of the execution of sub-tasks of FIG. 7 in accordance with another aspect of the disclosure.

FIG. 12 is a flowchart of the execution of a sub-task associated with task 740 in accordance with one aspect of the disclosure. It will be recalled that task 740 requires "navigating vehicle 101 based in the distance between vehicle 101 and the reference object." In one example, task 740 includes changing the speed or direction of the vehicle. At task 1210, vehicle control unit 110 switches to using a new control strategy. That is, vehicle control unit 110 stops using a first control strategy that it is currently using and starts using a second control strategy. As previously mentioned, control strategies may govern various aspects of the operation of vehicle 101. For example, the control strategies may determine where the vehicle 101 makes a turn, at what speeds it travels, where it stops for intersections, and so forth. Accordingly, the switch from the first control strategy to the second control results in a change in the operation of vehicle 101. For example, the change may be in the speed at which the vehicle travels, the route taken by the vehicle, where the vehicle stops for intersections, where the vehicle makes a turn, and so forth.

The control strategy can be derived by executing logic 252 or, alternatively, it can constitute a subset of the instructions that constitute logic 252. As used herein, the phrase "control strategy" includes:
  (i) one or more rules that govern at least one aspect of the operation of an autonomous or semi-autonomous vehicle, or
  (ii) one or more processes that govern at least one aspect of the operation of an autonomous or semi-autonomous vehicle, or
  (iii) both i and ii.

In some embodiments, vehicle control unit 110 changes the control strategy in order to address situations where the field of view of sensor 240 is likely diminished. Vehicle control unit compares the distance between vehicle 101 and the reference object to the range of sensor 240. If the distance is less than the sensor range, the vehicle control unit begins using a second control strategy that is appropriate for the situation at hand.

In one embodiment, the second control strategy does not depend on signal from sensor 240 (which is a laser scanner in this example). Instead, the second control strategy may depend on signal from other sensors, such as radar and sonar, for example.

In another embodiment, the second control strategy still depends on signal from sensor 240, but accounts for the fact that the sensor might have a diminished field of view. For instance, the new control strategy may be based on a model for the operation of sensor 240 in which the sensor has a diminished field of view. The diminished field of view may be up to the location of the reference object or some other distance that is shorter.

In some embodiments, vehicle control unit 110 changes the control strategy in order to adapt the operation of vehicle 101 to the vehicle's surroundings. Vehicle control unit 110 detects hills and other landforms that extend above the terrain surrounding vehicle 101. Vehicle control unit 110 takes pictures of the surrounding environment and uses image computer vision techniques to identify reference objects in the pictures that appeared to be hills. For example, the reference objects could be objects that protrude above the horizon line and have a "sand", "dirt", "rock", "soil" or "vegetation" appearance. After that, vehicle control unit 110 calculates the distance between vehicle and the selected reference objects.

In some embodiments, vehicle control unit uses the distance to create a model of the topology of the surroundings of vehicle 101 and select a control strategy that is most appropriate for the surroundings' topology.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A system comprising:
  memory storing a range value of an object detection sensor of a vehicle; and
  one or more processors configured to:
    determine, based on a pitch of the vehicle, a point P on a visual horizon;

determine a distance between the vehicle and an object that is located above and beyond the point P;
compare the distance to the range value; and
when the distance is less than the range value, change at least one of a speed of the vehicle and a heading of the vehicle in order to reduce a likelihood of collision with an object not currently detectable by the object detection sensor.

2. The system of claim 1, wherein the one or more processors are further configured to change at least one of the speed and heading of the vehicle based on at least a grade of a surface on which the vehicle is standing or driving exceeding a threshold grade value.

3. The system of claim 1, wherein the one or more processors are further configured to change at least one of the speed and heading of the vehicle based on at least the pitch of the vehicle exceeding a threshold pitch value.

4. The system of claim 1, further comprising a camera configured to capture a plurality of images, and wherein the plurality of images are used to determine the distance.

5. The system of claim 4, wherein the one or more processors are further configured to determine the point P further based on a signal received from a sensor that senses the pitch of the camera.

6. The system of claim 4, wherein the camera is a stereo camera.

7. The system of claim 4, wherein the one or more processors are further configured to identify the object by extracting a template of the object from a first image of the plurality of images and comparing the template against a plurality of object representations.

8. The system of claim 1, wherein the one or more processors are further configured to identify the object based on a comparison to a representation of a type of the object.

9. The system of claim 1, wherein the one or more processors are further configured to identify the object based on proximity to the point P.

10. The system of claim 1, wherein the one or more processors are further configured to:
receive a first image of a scene at least part of the vehicle's surroundings and a second image overlapping at least a part of the scene of the first image; and
process the first image and the second image in order to determine the point P.

11. A method comprising:
determining, by one or more processors, based on a pitch of a vehicle, a point P on a visual horizon;
determining, by the one or more processors, a distance between the vehicle and an object that is located above and beyond the point P;
comparing, by the one or more processors, the distance to a range value of an object detection sensor of the vehicle; and
when the distance is less than the range value, changing, by the one or more processors, at least one of a speed of the vehicle and a heading of the vehicle in order to reduce a likelihood of collision with an object not currently detectable by the object detection sensor.

12. The method of claim 11, wherein the at least one of the speed and heading of the vehicle are changed further based on at least a grade of a surface on which the vehicle is standing or driving exceeding a threshold grade value.

13. The method of claim 11, wherein the at least one of the speed and heading of the vehicle are changed further based on at least the pitch of the vehicle exceeding a threshold pitch value.

14. The method of claim 11, further comprising receiving a plurality of images from a camera, and wherein the distance is determined further based on the plurality of images.

15. The method of claim 14, wherein the point P is determined further based on a signal received from a sensor that senses the pitch of the camera.

16. The method of claim 14, wherein the camera is a stereo camera.

17. The method of claim 14, further comprising identifying the object by extracting a template of the object from a first image of the plurality of images and comparing the template against a plurality of object representations.

18. The method of claim 11, further comprising identifying the object based on a comparison to a representation of a type of the object.

19. The method of claim 11, further comprising identifying the object based on proximity to the point P.

20. The method of claim 11, further comprising:
receiving a first image of a scene at least part of the vehicle's surroundings and a second image overlapping at least a part of the scene of the first image; and
processing the first image and the second image in order to determine the point P.

* * * * *